United States Patent Office 3,452,892
Patented July 1, 1969

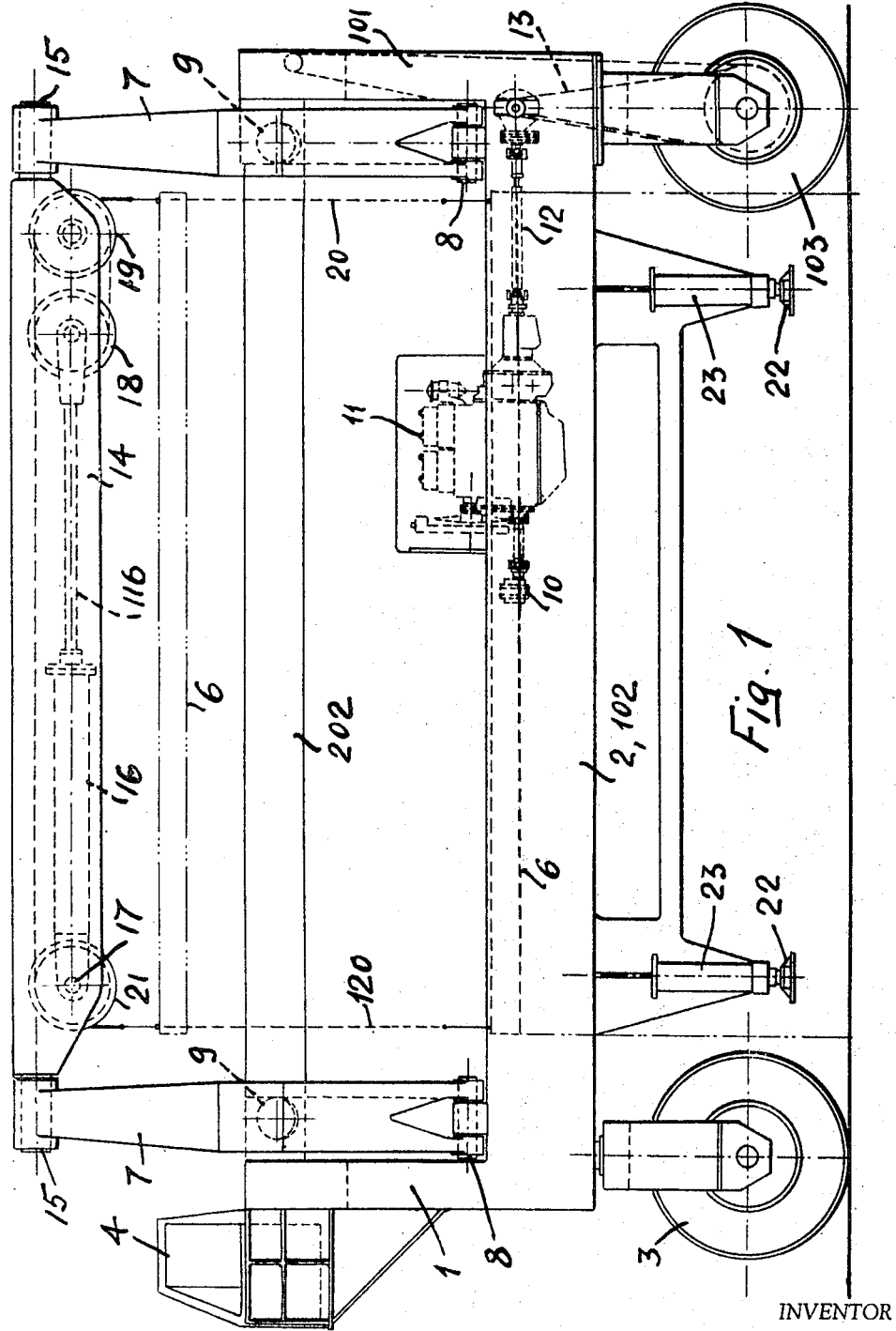

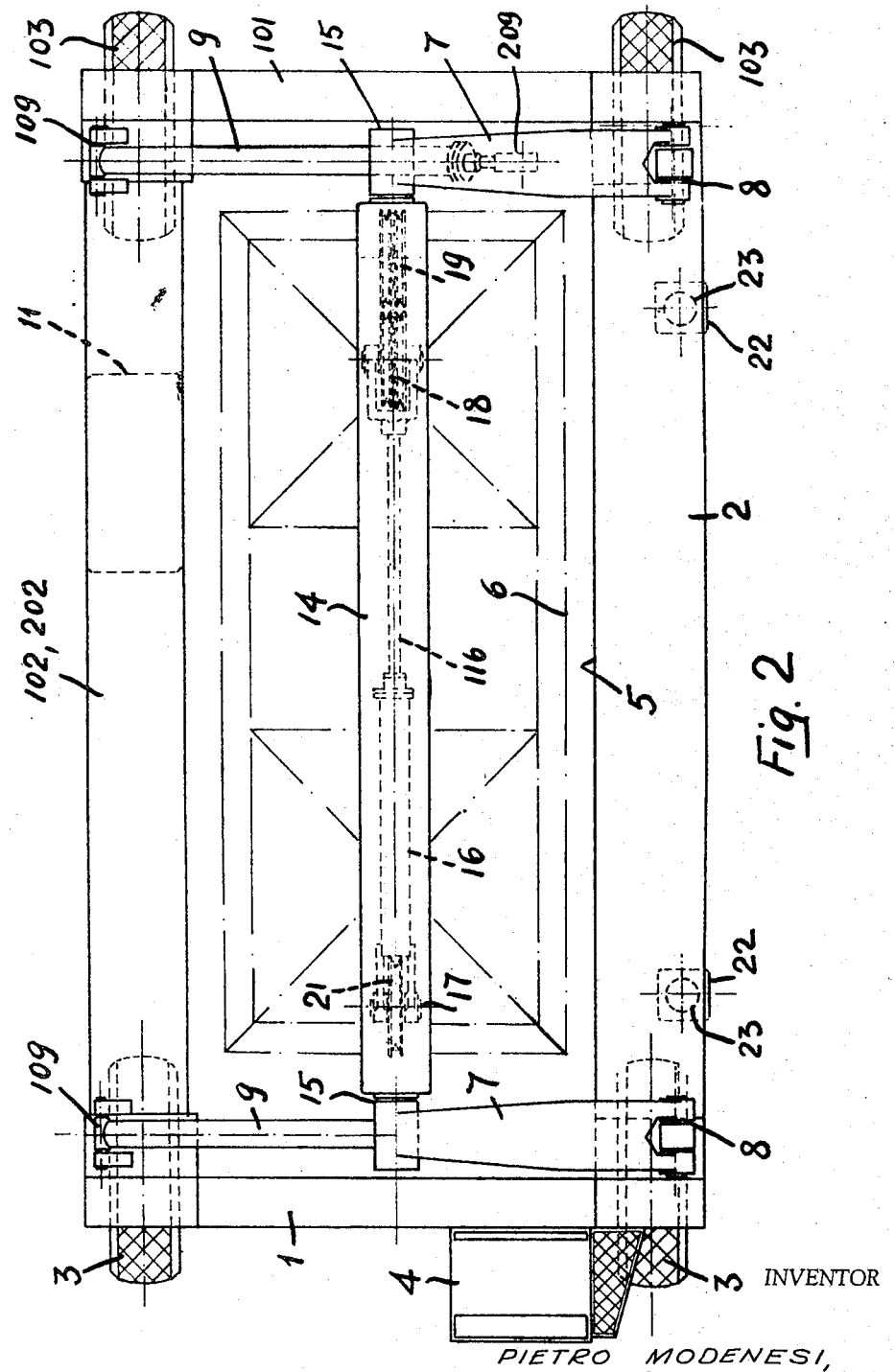

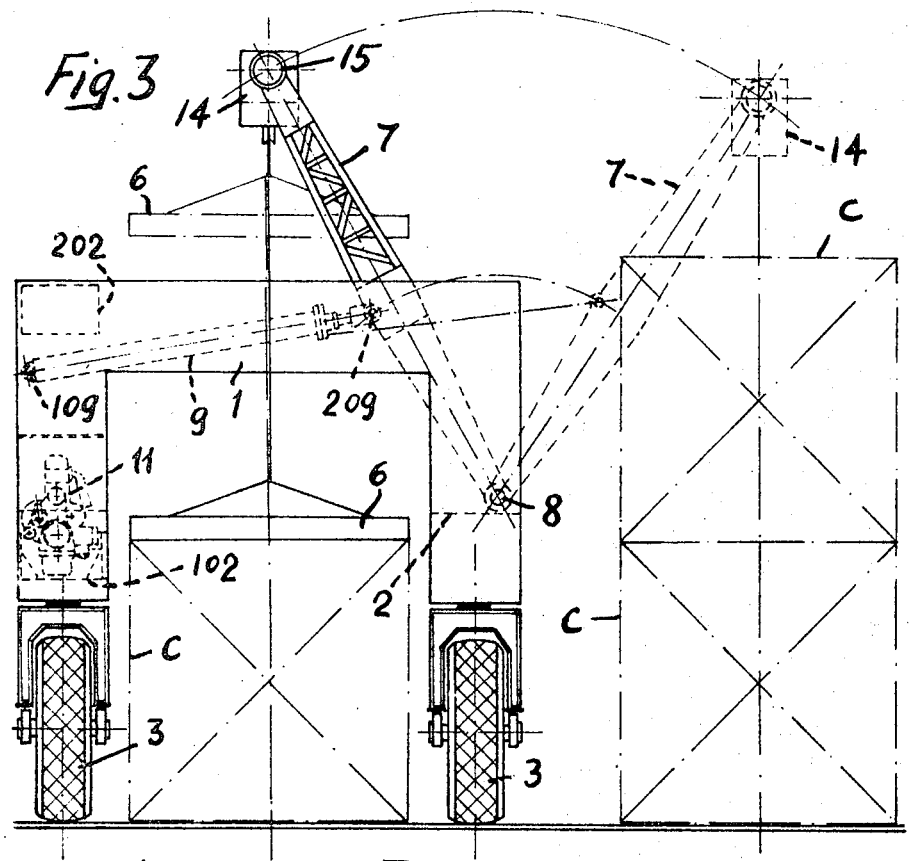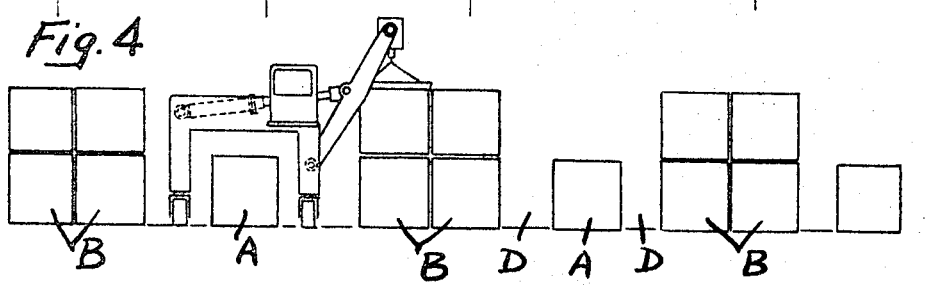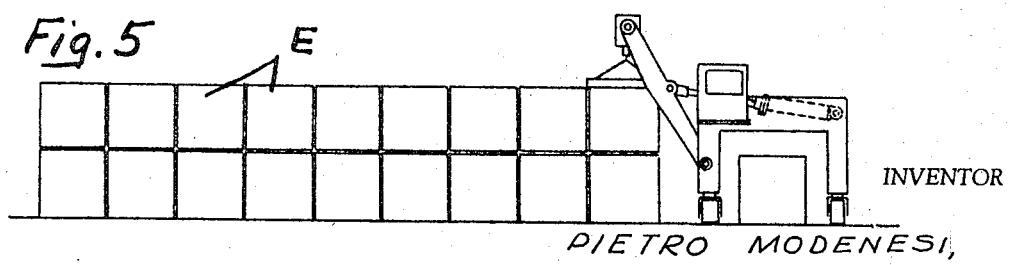

3,452,892
STRADDLE CARRIER
Pietro Modenesi, 17/14 Via Marcello Prestinari,
Genoa-Pegli, Italy
Filed Sept. 26, 1967, Ser. No. 670,589
Claims priority, application Italy, Sept. 29, 1966,
779,150
Int. Cl. B60p 3/00
U.S. Cl. 214—394                                6 Claims

ABSTRACT OF THE DISCLOSURE

A powered straddle containers carrier comprising a wheeled double portal frame having a vertical bight-like passage at one side of said frame. A pair of luffing jibs are carried by said frame in correspondence of said bight-like passage. The said luffing jibs are connected together at their free ends by means of a luffing beam housing the lift means for the containers, and means are provided for rocking said luffing jibs from one side of said vertical passage to the opposite side, for the sidewise transfer of one container.

---

This invention relates to the so-called straddle carriers, that is to powered automotive equipments which are particularly designed to straddle cargo containers, vans as well as flatcars, highway trucks and the like, for lifting and transferring the containers from dockside storage to the flatcars, or to the trucks, or from the trucks to the flatcars, or even also to stack one container atop another at any desired storage area or the like.

With the conventional straddle carriers it is impossible to directly transfer a container from, for example, a flatcar to a truck, without first straddling the flatcar, lifting the container, moving the straddle carrier with the lifted container so as to straddle the truck, and finally lowering the container onto the truck.

Moreover, with the known straddle carriers it is impossible to stack container rows in side-by-side relation, since it is necessary to leave two runstrips at the sides of each stored container row, for permitting the free passage of the carrier wheels. This means that a considerable area at the storage docks cannot be utilized for storing purposes.

The present invention aims mainly to obviate the above mentioned and other drawbacks connected with the prior art straddle carriers, and it is accordingly the main object of the present invention to provide an improved straddle carrier by means of which it is possible to straddle a load and to lift and transfer the lifted load sidewise of the straddle carrier, or conversely, to straddle a truck or other load-transport means and to lift and transfer a sidewise disposed load onto the straddled truck, or the like.

The above and other characteristic features and the advantages of the improved straddle carrier according to the invention will be apparent from the following detailed specification of one preferred embodiment of the invention, made with reference to the accompanying drawings, in which:

FIGURE 1 is a side view of a straddle carrier according to the invention.

FIGURE 2 is a plan view of the carrier shown in FIGURE 1.

FIGURE 3 is a front view of the carrier of FIGURES 1 and 2, and

FIGURES 4 and 5 diagrammatically show by way of example some container stacking manners by employing a straddle carrier according to the invention.

With particular reference to FIGURES 1 to 3 of the drawings, the straddle carrier as shown comprises two portal frames 1, 101, formed by inverted-U structures each formed by two upright legs connected at their tops by means of a transversal horizontal beam. The said portal frames are connected together at their lower leg ends by longitudinal side beams 2, 102, so as to provide a double portal frame structure provided with ample U-shaped side openings or bights 5 of such a width as to permit the free passage of a standard container C.

The said double frame structure is mounted on wheels 3, 103, thus constituting a straddle carrier. Wheels 103 are powered through a suitable transmission 12, 13 by engine 11, while the wheels 3 are the steering wheels of the carrier. 4 is the operator's cab, which is fitted in front of the portal frame 1.

At both ends of the side beam 2, in close proximity of the upright sections of the corresponding portal frames 1, 101 a luffing jib 7 is supported on pivots 8. The said luffing jibs 7 are connected together at their free ends by a jib beam 14, pivotally secured to the said jibs 7 by means of pivots 15.

To the upright sections or legs of the portal frames 1, 101 on the side of the straddle carrier opposite to the one by which the luffing jibs 7 are carried, a pair of luffing cylinders 9 are pivotally secured at their lower ends, as shown by 109. The piston rods sliding inside said cylinders 9 are pivotally connected at 209 to the luffing jibs 7. A hydraulic pump 10, operated by motor 11, is so mounted and provided with pipings for feeding fluid under pressure to the said cylinders for operation of the jibs 7.

As better shown in FIGURES 1 and 2, the jib beam 14 is hollow, shaped for housing inside the container-hoist mechanism. This hoist mechanism comprises a hydraulic power cylinder 16 hinged at one end on an axle 17 fitted at one end of the beam 14, and extending along a part of the beam itself. In said cylinder 16 a power piston is mounted provided with a rod 116 which is connected at its free end to a pair of pulleys 18, which are slidably guided in a conventional manner along beam 14. Said beam 14 is also provided, on the end at which the cylinder 16 is anchored, with a second pair of pulleys 21 journaled inside of beam 14, and at the opposite beam end with another pair of pulleys 19 adjacent to slidable pulleys 18. To the ends of a pair of steel ropes 20, 120 a container lift frame 6 of conventional construction is anchored. One of said ropes 20 is guided around one of the fixed pulleys 19 and around one of the slidable pulleys 18, and is then fastened to the beam 14. The second rope 120 is guided around fixed pulleys 21 and 19, and around slidable pulley 18, and is then secured to the beam 14. The said pulley pairs 18, 19 form together a horizontal tackle, for the hoisting and lowering of the lift frame 6. The lift frame 6 is rectangular and provided at each corner with conventional container-hooking means (not shown).

A pair of retractable feet 22 are carried by the longitudinal side beam 2 of the straddle carrier. The movement of the said feet is controlled through the associated hydraulic cylinders 23.

In the just-described embodiment of the invention, also a longitudinal upper frame beam 202 may be provided, for rigidly connecting together the top ends of the portal frames 1, 101, at the side of the carrier opposite to the side on which the luffing jibs are mounted.

The operation of the just described device is evident, upon consideration of FIGURE 3, in which the device is shown as straddling a container C which has to be lifted and transferred aside of the straddle carrier, atop of a second similar container C.

To this end, the luffing jibs 7 are rocked by means of the hydraulic cylinders 9 to a position in which the beam 14 lies in the middle longitudinal plane of the carrier frame (full line position of jibs 7 in FIGURE 3). Thereafter, the lift frame 6, by operating cylinder 16, is lowered atop of container C which is straddled by the carrier (full line position of FIGURE 3). Said container, firmly engaged by the hooking means of the lift frame 6, is thereafter lifted by operating the power cylinder 16, so as to cause piston rod 116 to be retracted and pulleys 18 to slide away from pulleys 19, thus promoting the lifting of the lift frame 6, and the hoisting of the container C suspended thereto to the position shown by dotted lines in FIGURE 3.

When the container C is suspended from the luffing jibs, fluid under pressure is admitted into cylinders 9 and 23. The fluid under pressure fed into the cylinders 9 will cause the simultaneous rocking movement of the luffing jibs sidewise of the carrier frame, from the position shown by full lines to the position shown by dotted lines in FIGURE 3. The container C hooked to the lift frame 6 suspended from the luffing beam 14 will be thus transferred sidewise of the carrier frame, passing over the longitudinal frame beam 2 through the lateral bight 5 in the carrier's frame.

The fluid under pressure admitted into the cylinders 23 will promote the lowering of the retractable feet 22 which will thus firmly bear on the ground during the said lateral transferring operation of the container C. Said container C is thereafter lowered atop the second container C, or even on the ground, by again admitting fluid under pressure into the opposite side of cylinder 16, so as to push movable pulleys 18 again towards the fixed pulleys 19.

In FIGURES 4 and 5 two examples are given of the possible mode of stacking the containers C by means of the straddle carrier according to the invention.

According to FIGURE 4, the said containers are stacked in rows B each formed by groups of four containers disposed in two rows of superimposed and side-by-side aligned containers, with the interposition of rows A of single containers A.

In FIGURE 5 a continuous side-by-side arrangement of the containers is shown.

It is thus evident that the straddle carrier according to the invention provides a device for stacking, transferring, loading and unloading of containers or similar loads which is more efficient than the prior art ones.

Of course, the invention is not limited to the described embodiment.

So, for instance, the luffing jibs 7 may be hinged to the carrier frame instead of sidewise, as shown in the drawings, in an intermediate position on the portal frames, so as to permit the loading and unloading from both sides of the device. Of course, in this case, the beam 202 will be suppressed.

Having thus described my invention, what I claim is:

1. A powered straddle carrier for the hoisting, transport, transfer and stacking of large cargo containers, comprising a wheeled portal frame including two inverted U-end frames to allow passage of said frame over a container, said U-end frames being connected together at their lower sides by two longitudinal beams, at least one vertical passage at one side of said frame for the sidewise transfer of one container, a pair of luffing jibs mounted on said frame adjacent said vertical passage, a luffing beam connecting the free ends of said luffing jibs, lift means carried by said luffing beam for engaging the containers to be lifted, power means on said portal frame for rocking said luffing jibs from one side of said vertical passage to the opposite side, and power means for operating said lift means.

2. A straddle carrier according to claim 1 in which said lift means comprises a horizontal tackle mounted in said luffing beam which is hollow, said tackle being operated through a hydraulic cylinder.

3. A straddle carrier according to claim 1 in which said luffing jibs are operated by means of hydraulic cylinders.

4. A straddle carrier according to claim 1, further comprising retractable, fluid operated feet mounted under said longitudinal side beams of the straddle carrier portal frame.

5. A straddle carrier according to claim 1, in which said luffing jibs are arranged sidewise of the carrier frame.

6. A straddle carrier according to claim 1, in which said luffing jibs are mounted on one of said two longitudinal beams.

References Cited

UNITED STATES PATENTS

| | | | |
|---|---|---|---|
| 1,918,419 | 7/1933 | Needham | 214—75 XR |
| 2,771,197 | 11/1956 | Leffler | 212—8 |
| 3,174,630 | 3/1965 | Tantlinger et al. | 212—8 |

FOREIGN PATENTS

| | | |
|---|---|---|
| 705,739 | 3/1965 | Canada. |

ALBERT J. MAKAY, *Primary Examiner.*

U.S. Cl. X.R.

212—9